Patented June 11, 1929.

1,716,492

UNITED STATES PATENT OFFICE.

HUGO HOFMANN, OF JOHNSON CITY, TENNESSEE, ASSIGNOR TO AMERICAN BEMBERG CORPORATION, OF NEW YORK, N. Y.

PRODUCTION OF A BASIC COPPER SULPHATE.

No Drawing. Application filed October 9, 1926, Serial No. 140,694, and in Germany October 20, 1925.

The present invention has for an object to provide an improved method of manufacturing basic copper sulphate suitable for the manufacture of ammoniacal copper oxide cellulose solutions for the spinning of artificial silk by the stretch spinning process.

The production of basic copper sulphate from copper sulphate by conversion with soda solutions, to be employed for dissolving cellulose, is already known (see for example German Patent No. 235,219). In the case of this process it is of course necessary to effect the conversion as hot as possible for at low temperatures copper carbonate is obtained, which is unsuitable for the preparation of concentrated cellulose solutions. Even when the conversion takes place at a high temperature, however, in which case all the carbon dioxide is expelled and no copper carbonate can form, the basic sulphate accruing is of variable composition, in that the proportion of the sulphuric acid residue to copper varies within certain limits. Notwithstanding careful maintenance of the same conditions success has not hitherto been attained in practice in obtaining by this process basic sulphate of uniform composition.

For the dissolving of cellulose, as is known, the basic copper sulphate is brought into solution in concentrated ammonia by adding soda lye. Under these circumstances the sulphuric acid residue of the basic copper sulphate is split off and the equivalent quantity of sodium sulphate formed. The latter, however, as has been ascertained, influences the spinning process in a remarkable way. Thus since with basic copper sulphate of varying composition cellulose solution of a variable percentage of sodium sulphate is formed, a uniform spinning process cannot be attained in such a manner. A further disadvantage of the process mentioned consists in the fact that in the presence of heat, copper oxide is produced as soon as even only a small excess beyond the requisite quantity of soda is employed. Copper oxide itself however is extremely injurious for the purpose indicated as it is not soluble in ammonia.

Now it has been discovered that in a different manner a basic copper sulphate of very uniform composition can be obtained. If ammoniacal copper sulphate is acidified with sulphuric acid, a basic copper sulphate is obtained, the analysis of which always yields practically the same percentage of sulphuric acid. When employing this product cellulose solutions can be prepared containing a uniform percentage of sodium sulphate, which in their turn render possible the manufacture of a uniform artificial silk and obviate variations and disturbances in the working. It is also advantageous in the process forming the subject-matter of the present application that the acid necessary for the conversion need not be accurately measured. An excess does not occasion the formation of injurious substances. In the event of an excess of acid, copper sulphate is formed, which admits of being easily removed by washing out. On the other hand an insufficiency of acid does not have any influence upon the quality of the basic sulphate since the unconverted ammoniacal copper sulphate can likewise be easily washed out.

The process forming the subject-matter of this invention is very particularly valuable owing to the fact that in accordance therewith cupriferous wastes of the cuprammonium stretch spinning process can be worked up. In the case of this process copper is found in the precipitant in the form of copper hydroxide separated out in flakes, and in the acidifying liquid usually as copper sulphate. From the latter it admits of being separated out in an impure form as cement copper. These various copper wastes admit of being brought into solution as ammoniacal copper sulphate, together or separately, by ammonium sulphate and ammonia in some cases by stirring with air or by admitting air. From this solution by acidifying in the manner described above, is obtained the basic copper sulphate, which is particularly suitable for the manufacture of artificial silk. In this manner the copper of this manufacture always admits of being employed again in the cycle of operations.

The preparation of ammoniacal copper sulphate by dissolving copper hydroxide or copper by ammonium sulphate and ammonia is in itself known.

Example I.

100 kilograms of copper hydroxide obtained from the waste waters from the manufacture of cuprammonium silk, with a water content of 42 per cent, are introduced into an aqueous solution of 72 kilograms of ammonium sulphate and well stirred. 80 kilograms of ammonia solution having a specific gravity of 0.909 are then added, so that all the copper hydroxide dissolves to ammoniacal copper sulphate. 92 kilograms of sulphuric acid of about 60° Baumé are then slowly poured in and in this way 72 kilograms of basic copper sulphate are obtained.

Example II.

Over 100 kilograms of cement copper, which are obtained from the acid waste liquors of the cuprammonium stretch spinning process, are poured a solution of 160 kilograms of ammonium sulphate in water and 172 kilograms of ammonia having a specific gravity of 0.910 and the whole is agitated by a strong current of air. After a few hours the dissolving is finished, the iron is filtered off and with the pure solution of ammoniacal copper sulphate is slowly mixed 210 kilograms of sulphuric acid of 60° Baumé. In this manner are obtained 190 kilograms of basic sulphate.

In the conversion of ammoniacal copper sulphate with sulphuric acid into basic copper sulphate, ammonium sulphate is obtained as a by-product. The latter admits in part of being used again unchanged for dissolving the cupriferous waste substances of the cuprammonium silk process, and the other part is transformed in a known manner into free ammonia, which is employed for the same purpose. By this means a complete circulation of the ammonia is rendered possible in the process, which is of particular importance from the point of view of economy.

What I claim is:

1. The process for the production of basic copper sulphate which comprises as a step precipitating copper sulphate from a solution of ammoniacal copper sulphate by the addition of sulphuric acid.

2. The process for the production of basic copper sulphate which comprises introducing copper hydroxide into an aqueous solution of ammonium sulphate, adding ammonia solution to dissolve the copper hydroxide to ammoniacal copper sulphate and adding sulphuric acid to form basic copper sulphate.

3. The process for the production of basic copper sulphate as defined in the preceding claim, in which the several constituents are combined in the following proportions, by weight, 100 parts copper hydroxide having water content of 42%, 72 parts of ammonium sulphate, 80 parts of ammonia having a specific gravity of 0.909 and 92 parts of sulphuric acid of about 60° Baumé.

4. The process for the production of basic copper sulphate which comprises adding copper sulphate to a solution of ammonium sulphate and ammonia and agitating the same, filtering the resulting compound and adding sulphuric acid to the filtrate to form basic copper sulphate.

5. The process for the production of basic copper sulphate, as defined in the preceding claim, in which the several constituents are combined in the following proportions, by weight, 100 parts of cement copper, 160 parts of ammonium sulphate, 172 parts of ammonia having a specific gravity of 0.910, 210 parts of sulphuric acid of 60° Baumé.

6. The process for the production of basic copper sulphate, which comprises dissolving cement copper in ammonia and ammonium sulphate solution to form ammoniacal copper sulphate and adding sulphuric acid to precipitate basic copper sulphate.

In testimony whereof I have affixed my signature.

HUGO HOFMANN.